United States Patent
Liao

(10) Patent No.: US 9,298,286 B2
(45) Date of Patent: Mar. 29, 2016

(54) FINGER CONTROL DEVICE

(75) Inventor: Chien-Jung Liao, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 669 days.

(21) Appl. No.: 13/326,628

(22) Filed: Dec. 15, 2011

(65) Prior Publication Data

US 2012/0206346 A1 Aug. 16, 2012

(30) Foreign Application Priority Data

Feb. 14, 2011 (TW) .............................. 100104767 A

(51) Int. Cl.
*G06F 3/033* (2013.01)
*G06F 3/0362* (2013.01)
*G06F 3/01* (2006.01)

(52) U.S. Cl.
CPC .............. *G06F 3/0362* (2013.01); *G06F 3/014* (2013.01); *G06F 2203/0331* (2013.01)

(58) Field of Classification Search
CPC ..... G06F 3/0312; G06F 3/0314; G06F 3/033; G06F 3/0338; G06F 3/0354; G06F 3/03541; G06F 3/0362; G06F 2203/0331; G06F 2203/0335; G06F 3/0304; G06F 3/03543; G06F 2203/0333; G06F 3/014; H01H 2009/0221
USPC .................................................. 345/156–169
See application file for complete search history.

(56) References Cited

U.S. PATENT DOCUMENTS

| | | | | |
|---|---|---|---|---|
| 4,414,537 A * | 11/1983 | Grimes | ............................ | 341/20 |
| 5,097,252 A * | 3/1992 | Harvill et al. | ................. | 340/540 |
| 6,526,669 B2 * | 3/2003 | Nagata | ............................ | 33/503 |
| 6,850,224 B2 * | 2/2005 | Baughman | ..................... | 345/163 |
| 7,321,357 B1 * | 1/2008 | Monney | ........................ | 345/156 |
| 2001/0035856 A1 * | 11/2001 | Myers | ............................ | 345/156 |
| 2002/0163495 A1 * | 11/2002 | Doynov | ......................... | 345/156 |
| 2004/0046732 A1 * | 3/2004 | Chesters | ........................ | 345/156 |

(Continued)

FOREIGN PATENT DOCUMENTS

| CN | 2733446 | 10/2005 |
|---|---|---|
| CN | 101813975 | 8/2010 |

(Continued)

OTHER PUBLICATIONS

Office Action with abridged English translation in 100104767 dated Oct. 22, 2013.

(Continued)

*Primary Examiner* — Amr Awad
*Assistant Examiner* — Roberto Flores
(74) *Attorney, Agent, or Firm* — Nixon & Vanderhye P.C.

(57) ABSTRACT

A finger control device for controlling an electronic device to switch an operating mode thereof includes a main body, a sensor unit and a control unit. The main body includes a first securing part to be disposed on a palm, and a second securing part to be disposed on a finger. The sensor unit includes a first sensor element disposed at a first section of the finger, and a second sensor element disposed at a second section of the finger. Interaction between the two sensor elements is controlled through bending of the finger. The control unit controls the electronic device to operate in a first mode when the first sensor element interacts with the second sensor element, and to operate in a second mode when the first sensor element does not interact with the second sensor element.

10 Claims, 6 Drawing Sheets

(56) References Cited

U.S. PATENT DOCUMENTS

| | | | |
|---|---|---|---|
| 2005/0030288 A1* | 2/2005 | Johnson | 345/167 |
| 2005/0052412 A1* | 3/2005 | McRae et al. | 345/158 |
| 2006/0109246 A1* | 5/2006 | Lee et al. | 345/163 |
| 2006/0176268 A1* | 8/2006 | Oquist et al. | 345/156 |
| 2006/0227101 A1* | 10/2006 | Kackman | 345/156 |
| 2007/0002015 A1* | 1/2007 | Mohri et al. | 345/157 |
| 2007/0035518 A1* | 2/2007 | Francz et al. | 345/163 |
| 2007/0279380 A1* | 12/2007 | Murillo | 345/161 |
| 2008/0042995 A1* | 2/2008 | Li et al. | 345/175 |
| 2009/0058802 A1* | 3/2009 | Orsley | 345/157 |
| 2009/0212979 A1* | 8/2009 | Catchings et al. | 341/20 |
| 2009/0322680 A1* | 12/2009 | Festa | 345/160 |
| 2010/0220054 A1* | 9/2010 | Noda et al. | 345/156 |

FOREIGN PATENT DOCUMENTS

| | | |
|---|---|---|
| TW | 200606690 A | 2/2006 |
| TW | 201009650 A | 3/2010 |

OTHER PUBLICATIONS

Chinese Office Action issued in corresponding Chinese Application No. 201110050070.4 dated Mar. 28, 2014 (with translation).

* cited by examiner

//  FINGER CONTROL DEVICE

CROSS-REFERENCE TO RELATED APPLICATION

This application claims priority of Taiwanese Application No. 100104767, filed on Feb. 14, 2011, and the disclosure of which is incorporated herein by reference.

BACKGROUND OF THE INVENTION

1. Field of the Invention

The present invention relates to a finger control device, more particularly to a finger control device capable of controlling an electronic device to switch an operating mode thereof.

2. Description of the Related Art

Currently, as market competition and requirements of users continue to grow, optical sensing technology for computer mice have also advanced. Manufacturers have also brought their creativity into full play and sought technological breakthroughs in application aspects and functional aspects of the computer mice.

For a current computer mouse, a flat plane is required for operation of the current computer mouse thereon so as to control movement of a cursor. Moreover, a wheel of the current computer mouse may only control a displayed vertical scroll to scroll in a vertical direction and may not control a displayed horizontal scroll to perform corresponding horizontal scrolling movement. Therefore, the current computer mouse has a lot of limitations such that convenience in usage may not be promoted.

SUMMARY OF THE INVENTION

Therefore, an object of the present invention is to provide a finger control device to be disposed on a user's hand for controlling an electronic device to switch an operating mode thereof.

Accordingly, the finger control device of the present invention is to be disposed on a user's hand for controlling an electronic device to switch an operating mode thereof. The finger control device comprises a main body, a sensor unit and a control unit.

The main body includes a first securing part to be disposed on a palm of the hand and a second securing part. The second securing part includes a first finger securing portion and a second finger securing portion. The first finger securing portion is to be disposed on a first section of a finger of the hand and is connected to the first securing part. The second finger securing portion is to be disposed on a second section of the finger and is movably connected to the first finger securing portion. The sensor unit includes a first sensor element disposed at the first finger securing portion, and a second sensor element disposed at the second finger securing portion. The second finger securing portion is movable through bending of the finger between a first position in which the first sensor element is able to interact with the second sensor element and a second position in which the first sensor element is unable to interact with the second sensor element. The control unit is disposed at the main body and is operable to control the electronic device to operate in a first mode when the second finger securing portion is at the first position, and to control the electronic device to operate in a second mode when the second finger securing portion is at the second position. Therefore, the user may enable the second finger securing portion to move between the first position and the second position merely through bending of the finger so as to switch the operating mode of the electronic device such that convenience in usage is increased.

In a first embodiment of the present invention, the first sensor element is a light sensor module, and the second sensor element is a light source. The second finger securing portion is at the first position when the light sensor module is able to sense light beams emitted from the light source. The second finger securing portion is at the second position when the light sensor module is unable to sense the light beams emitted from the light source.

In a second embodiment of the present invention, the first sensor element is a conductive element, and the second sensor element is another conductive element. The second finger securing portion is at the first position when the two conductive elements are able to contact each other. The second finger securing portion is at the second position when the two conductive elements are unable to contact each other.

The finger control device further comprises a wheel unit. The wheel unit is rotatably disposed at the second securing part. The control unit is further operable to control the electronic device to perform a corresponding action according to rotation of the wheel unit.

Preferably, the wheel unit includes a lower casing connected to the second securing part of the main body, an upper casing able to combine with the lower casing, a wheel element, and an encoder. The lower casing has a lower recess part and two first casing fasteners respectively disposed at opposite ends of the lower casing. The upper casing has an upper recess part corresponding in position to the lower recess part, and two second casing fasteners respectively disposed at opposite ends of the upper casing and respectively corresponding in position to the first casing fasteners. One of the first and second casing fasteners is a hole, and the other one of the first and second casing fasteners is a post to engage the hole. The upper casing and the lower casing cooperate to define an opening when combined together. The wheel element includes a rotatable wheel body and two protrusions respectively extending from opposite sides of the wheel body. Each of the protrusions extends into a respective one of the upper recess part and the lower recess part for retaining rotatably the wheel element between the upper casing and the lower casing. The wheel body has a portion exposed from the upper casing and the lower casing through the opening. The encoder is disposed at one of the upper casing and the lower casing for generating a corresponding wheel signal according to rotation of the wheel body.

Moreover, the control unit includes a processing module disposed at the first securing part of the main body, and a transmission module disposed at the first securing part and electrically coupled to the processing module. The processing module controls operation of the electronic device in the first mode according to rotation of the wheel unit while the second finger securing portion is at the first position, and controls operation of the electronic device in the second mode according to rotation of the wheel unit while the second finger securing portion is at the second position. The transmission module is used for communication with the electronic device, and transmits control signals generated by the processing module to the electronic device.

The effect of the present invention resides in that the user may control whether the first sensor element and the second sensor element interact with each other or not through bending of the finger so as to switch the operating mode of the electronic device. Therefore, a function of the wheel unit is expanded and convenience in usage is increased.

BRIEF DESCRIPTION OF THE DRAWINGS

Other features and advantages of the present invention will become apparent in the following detailed description of the two embodiments with reference to the accompanying drawings, of which.

DETAILED DESCRIPTION OF THE PREFERRED EMBODIMENT

Figure 1:
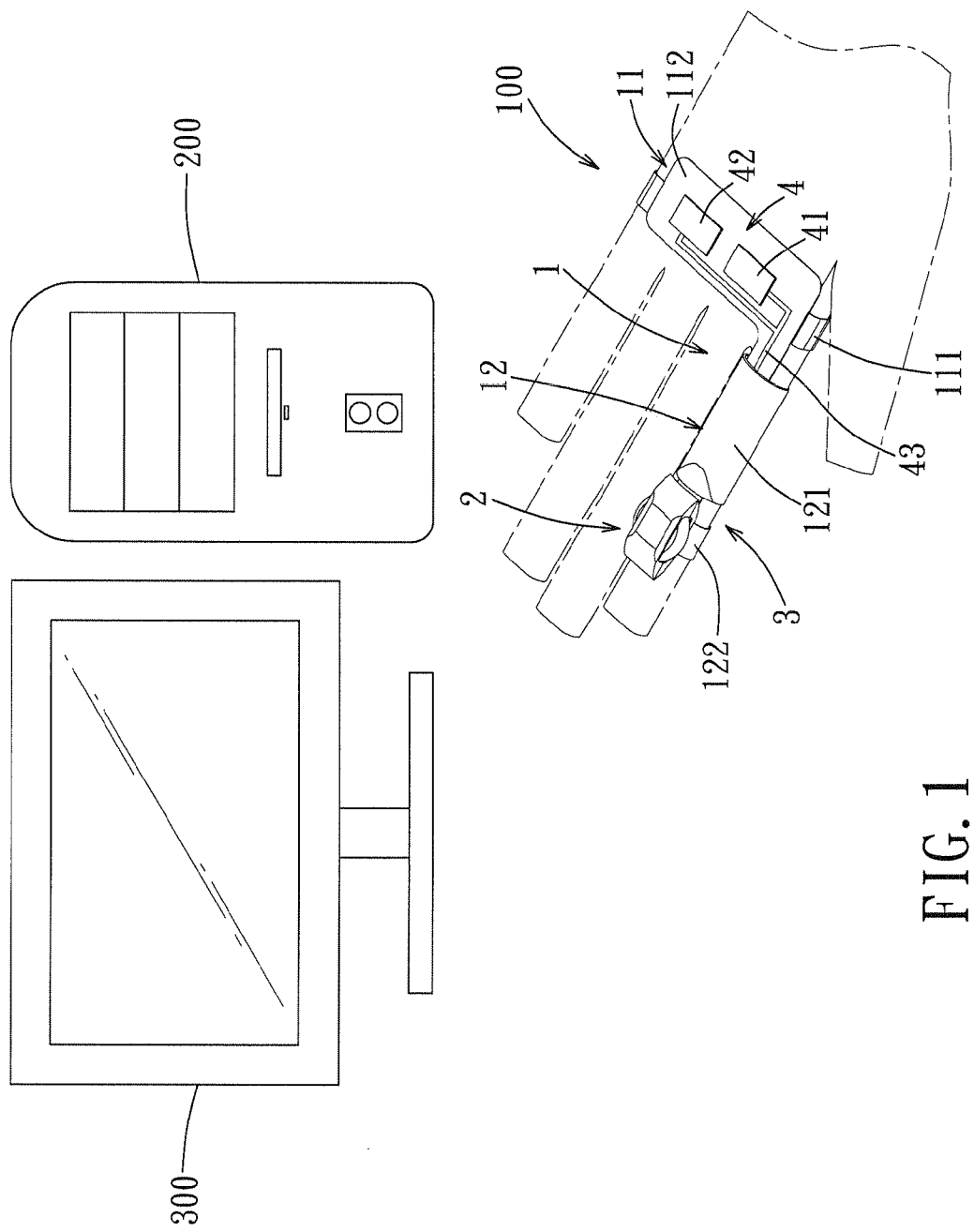
FIG. 1 is a perspective view illustrating a first embodiment of a finger control device of the present invention.

Referring to FIG. 1, a first embodiment of a finger control device 100 according to the present invention is illustrated. The finger control device 100 is to be disposed on a user's hand for controlling an electronic device (a computer 200 being given as an example in this embodiment) to switch an operating mode thereof between a first mode and a second mode. In this embodiment, the finger control device 100 comprises a main body 1, a wheel unit 2, a sensor unit 3 and a control unit 4.

The main body 1 includes a first securing part 11 to be disposed on a palm of the hand of the user and a second securing part 12 to be disposed on a finger of the hand of the user. The first securing part 11 includes a securing portion 111 for securing to the palm, and a disposing portion 112 connected to the securing portion 111 and to be located at a back side of the palm. The disposing portion 112 is provided for disposing the control unit 4 thereon. Details of the control unit 4 will be provided in the succeeding paragraphs. The securing portion 111 has a structure of a long strap, and each of opposite ends of the securing portion 111 may be provided with a connecting member such as a hook-and-loop fastener (not shown) so as to secure the first securing part 11 to palms of different users with different sizes. Moreover, the securing portion 111 may be made of flexible materials for elastically securing to the palm of the user by virtue of flexibility of the securing portion 111. Disposition of connecting members is not required if this alternative is adopted. Therefore, the way for securing is not limited to the disclosure of the present invention.

The second securing part 12 includes a first finger securing port ion 121 and a second finger securing portion 122. The first finger securing portion 121 has a structure of a hollow cylinder, and has a cylinder length substantially equal to that of a section of the finger for securing to a first section of an index finger of the user in a wearing-through manner. One end of the first finger securing portion 121 is connected to one side of the disposing portion 112 of the first securing part. The second finger securing portion 122 likewise has a structure of a hollow cylinder for securing to a second section of the index finger of the user in a wearing-through manner. The second finger securing portion 122 is movably connected to another end of the first finger securing portion 121. In this embodiment, the finger control device 100 is disposed on the user's right hand, and each of the first finger securing portion 121 and the second finger securing portion 122 is secured to a respective one of the first section and the second section of the index finger proximate to the palm. However, dispositions thereof are not limited to the disclosure above. The second securing part 12 may be disposed on a middle finger or a ring finger, and the first finger securing portion 121 may be connected to another side of the disposing portion 112 so as to enable a left-handed user to wear the finger control device 100.

Figure 2:
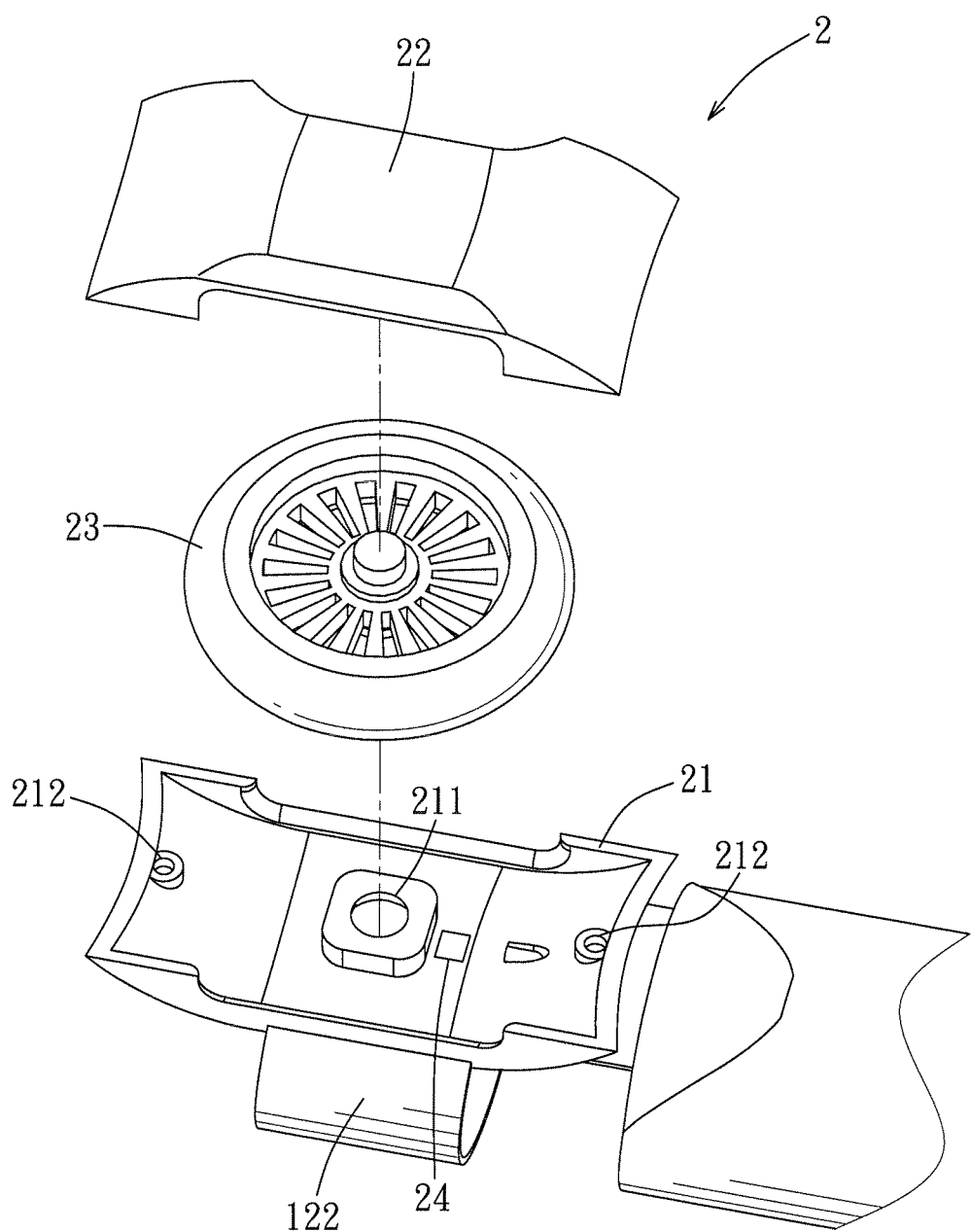
FIG. 2 is an exploded perspective view of a wheel unit of the first embodiment.
Figure 3:
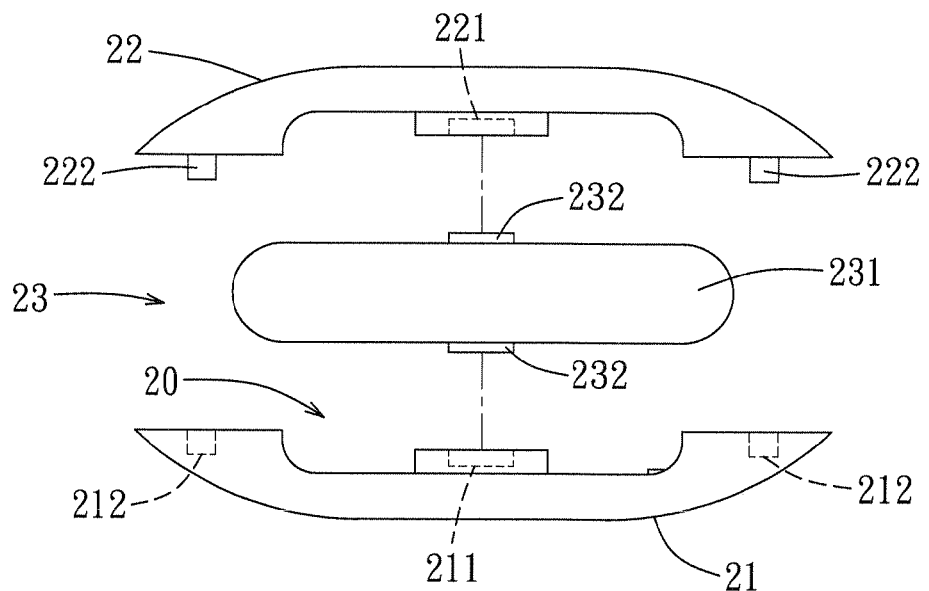
FIG. 3 is a side elevation perspective view of the wheel unit of the first embodiment.

Referring to FIG. 2 and FIG. 3, the wheel unit 2 includes a lower casing 21 connected to the second finger securing portion 122 of the second securing part 12, an upper casing 22 able to combine with the lower casing 21, a wheel element 23, and an encoder 24. A longitudinal cross section of the lower casing 21 is designed in a curve style so as to fit a back side of the user's finger. The lower casing 21 has a lower recess part 211 disposed at a substantially center position of the lower casing 21, and two first casing fasteners 212 respectively disposed at opposite ends of the lower casing 21. The upper casing 22 has substantially the same appearance as the lower casing 21. The upper casing 22 has an upper recess part 221 corresponding in position to the lower recess part 211, and two second casing fasteners 222 respectively disposed at opposite ends of the upper casing 22 and respectively corresponding in position to the first casing fasteners 212. In this embodiment, the first casing fasteners 212 are holes and the second casing fasteners 222 are posts to engage the holes. The upper casing 22 and the lower casing 21 cooperate to de fine an opening 20 when combined together. The wheel element 23 includes a rotatable wheel body 231 and two protrusions 232 respectively extending from opposite sides of the wheel body 231. Each of the protrusions 232 extends into a respective one of the upper recess part 221 of the upper casing 22 and the lower recess part 211 of the lower casing 21 for retaining rotatably the wheel element 23 between the upper casing 22 and the lower casing 21. The wheel body 231 has a portion exposed from the upper casing 22 and the lower casing 21 through the opening 20. The encoder 24 may be one of a mechanical encoder and an optical encoder. The encoder 24 is disposed at the lower casing 21 for generating a corresponding analog wheel signal according to rotation of the wheel body 231 resulting from scrolling by the user, and transmits the analog wheel signal to the control unit 4. It should be noted that disposition of the wheel unit 2 is not limited to the second finger securing portion 122. The wheel unit 2 may be disposed on the first finger securing portion 121 and the disposition should not be limited to the disclosure in this embodiment.

Figure 4:
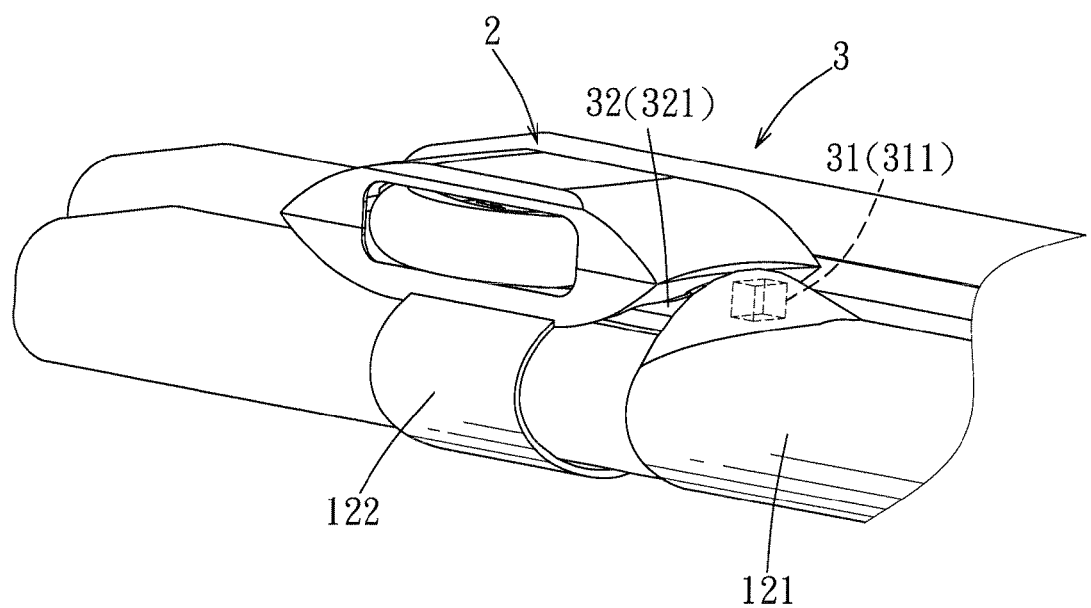
FIG. 4 is a perspective view illustrating a second finger securing portion of the first embodiment at a first position.
Figure 5:
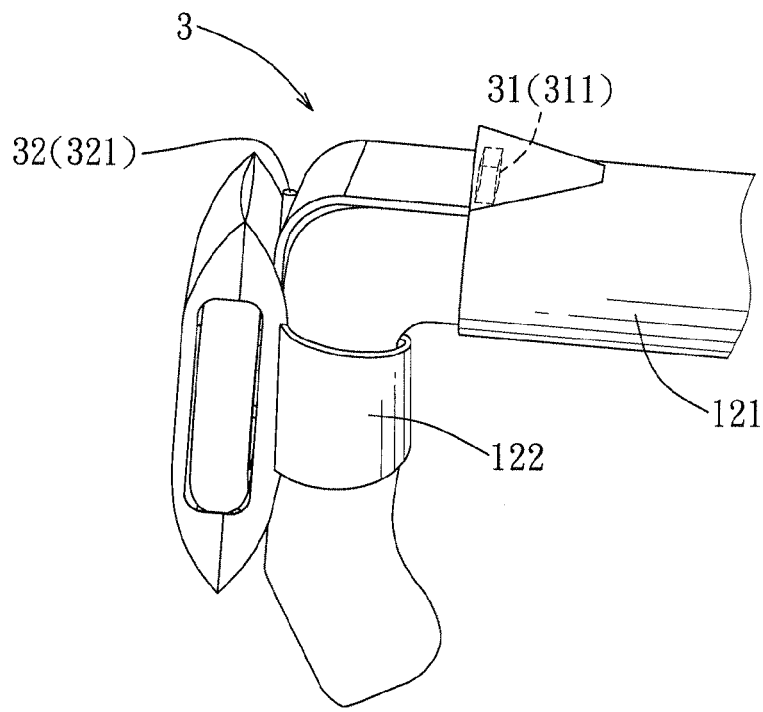
FIG. 5 is a perspective view illustrating the second finger securing portion of the second embodiment at a second position.

Referring to FIGS. 1, 4 and 5, the sensor unit 3 includes a first sensor element 31 disposed at the first finger securing portion 121, and a second sensor element 32 disposed at the second finger securing portion 122. In this embodiment, the first sensor element 31 is a light sensor module 311, and the second sensor element 32 is an infrared light source 321. The second finger securing portion 122 is movable through bending of the finger between the first position (referring to FIG. 4) in which the light sensor module 311 is able to sense light beams emitted from the infrared light source 321, and a second position (referring to FIG. 5) in which the light sensor module 311 is unable to sense the light beams emitted from the infrared light source 321.

Figure 6:
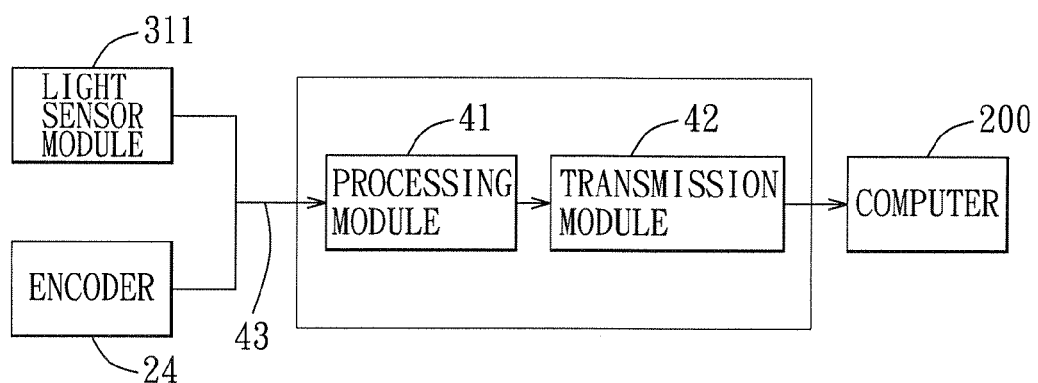
FIG. 6 is a circuit block diagram illustrating a control unit of the first embodiment.

Referring to FIG. 1 and FIG. 6, the control unit includes a processing module 41 disposed at the disposing portion 112 of the first securing part 11, a transmission module 42 disposed at the disposing portion 112 of the first securing part 11 and electrically coupled to the processing module 41, and a signal cable 43 disposed at the disposing portion 112 and the second securing part 12. The processing module 41 controls operation of the computer 200 in the first mode according to rotation of the wheel unit 2 while the second finger securing portion 122 is at the first position, and controls operation of the computer 200 in the second mode according to rotation of the wheel unit 2 while the second finger securing portion 122 is at the second position. The transmission module 42 is used for communication with the computer 200, and transmits control signals generated by the processing module 41 to the computer 200 in a wireless manner. The signal cable 43 is a flexible transmission line, and electrically couples the processing module 41, the transmission module 42, the light sensor module 311 and the encoder 24 of the wheel unit 2 for signal transmission there among. The control unit 4 may include a transmission interface (not shown), instead of the transmission module 42, for communicating with the computer 200 in a wired manner.

More specifically, when the user wears the finger control device 100 at the right hand and stretches the index finger of the right hand (as shown in FIG. 4), the second finger securing portion 122 is at the first position, such that the light sensor module 311 located at the first finger securing portion 121 is able to sense the light beams emitted from the infrared light source 321 located at the second finger securing portion 122 and to transmit a sensor signal to the processing module 41. The processing module 41 controls the computer 200 to operate in the first mode according to the sensor signal. In this embodiment, the first mode is a horizontal-scrolling mode. Therefore, when the user scrolls the wheel body 231 of the wheel unit 2, the encoder 29 may correspondingly generate the analog wheel signal and transmit the analog wheel signal to the processing module 41 via the signal cable 43. The processing module 41 transforms the analog wheel signal and transmits the transformed wheel signal to the computer 200 via the transmission module 42, such that the computer 200 may control an image (such as a web page) displayed by a displayer 300 (see FIG. 1) to scroll in a horizontal direction in correspondence to rotation of the wheel body 231.

On the contrary, when the user bends the index finger such that the second finger securing portion 122 is at the second position (as shown in FIG. 5), the light sensor module 311 is unable able to sense the light beams emitted from the infrared light source 321 and is not activated. At this time, the processing module 41 controls the computer 200 to operate in the second mode. In this embodiment, the second mode is a vertical-scrolling mode. That is, when the user scrolls the wheel body 231 of the wheel unit 2, the processing module 41 transforms the analog wheel signal generated by the encoder 24 and transmits the transformed wheel signal to the computer 200 via the transmission module 42, such that the computer 200 may control the image displayed by the displayer 300 to scroll in a vertical direction in correspondence to rotation of the wheel body 231.

Figure 7:
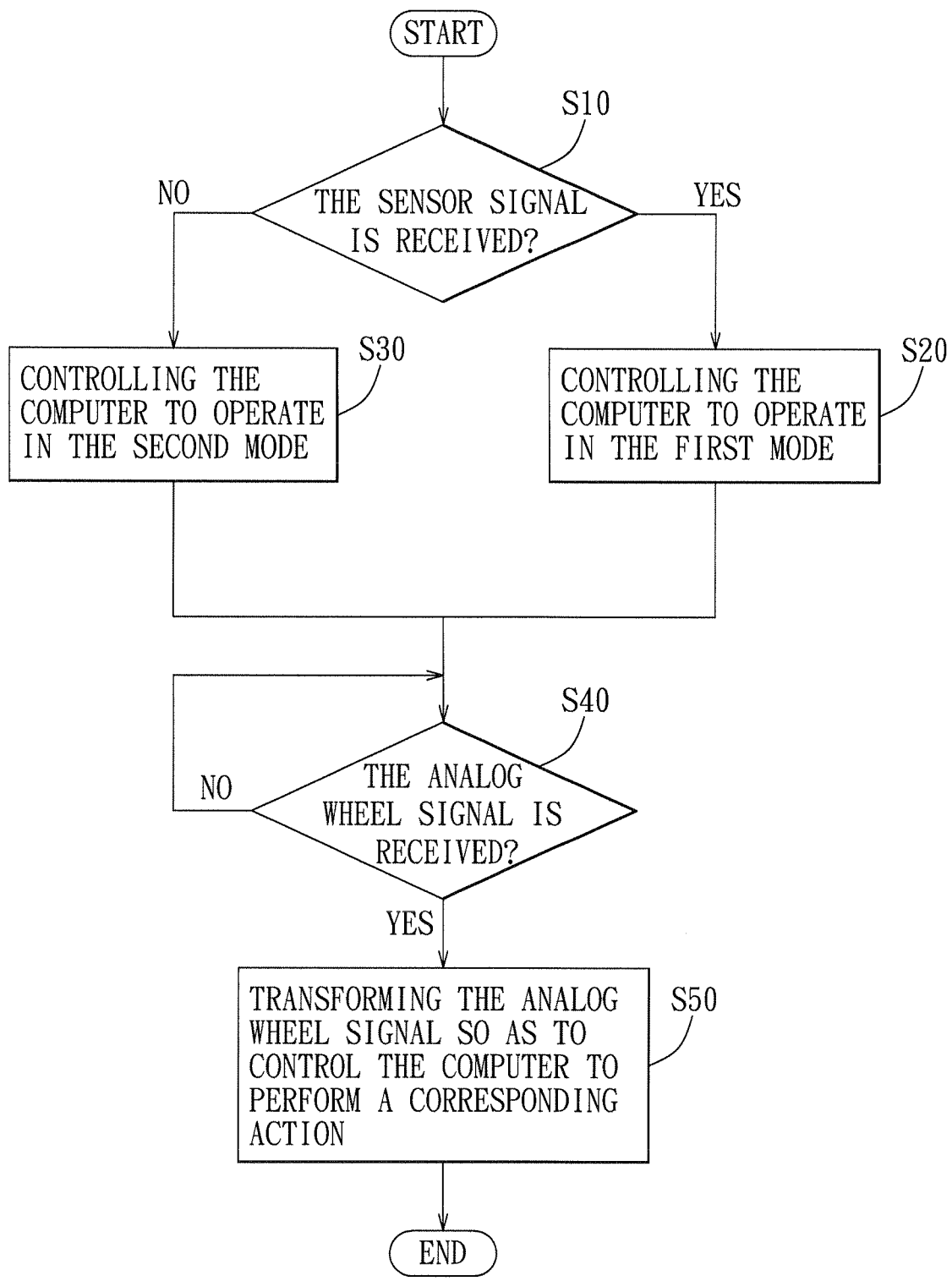
FIG. 7 is a flowchart illustrating processing flow of the processing module of the first embodiment after the finger control device is activated.

In other words, in an aspect of the processing module 41, after the finger control device 100 is activated, the processing module 41 performs the steps shown in FIG. 7.

First, in step S10, it is detected whether the sensor signal transmitted from the light sensor module 311 is received by the processing module 41. If the sensor signal is received, this means that the second finger securing portion 122 is at the first position and the processing module 41 proceeds to step S20. In step S20, the computer 200 is controlled to operate in the horizontal-scrolling mode (first mode). If the sensor signal is not received, this means that the second finger securing portion 122 is at the second position and the processing module 41 proceeds to step S30. In step 30, the computer 200 is controlled to operate in the vertical-scrolling mode (the second mode).

Subsequently, in step 40, the processing module 41 detects whether the analog wheel signal generated by the encoder 24 is received thereby. If the analog wheel signal is received, this means that the wheel body 231 is scrolled by the user and the processing module 41 proceeds to step S50. In step S50, the analog wheel signal is transformed so as to control the computer 200 to perform a corresponding action, i.e., controlling the image displayed by the displayer 300 to scroll in one of the horizontal and vertical directions. In this way, a function of the wheel unit 2 is expanded, and the user may switch a scrolling manner of the wheel unit 2 merely through bending of the finger so that convenience in usage is increased.

Figure 8:
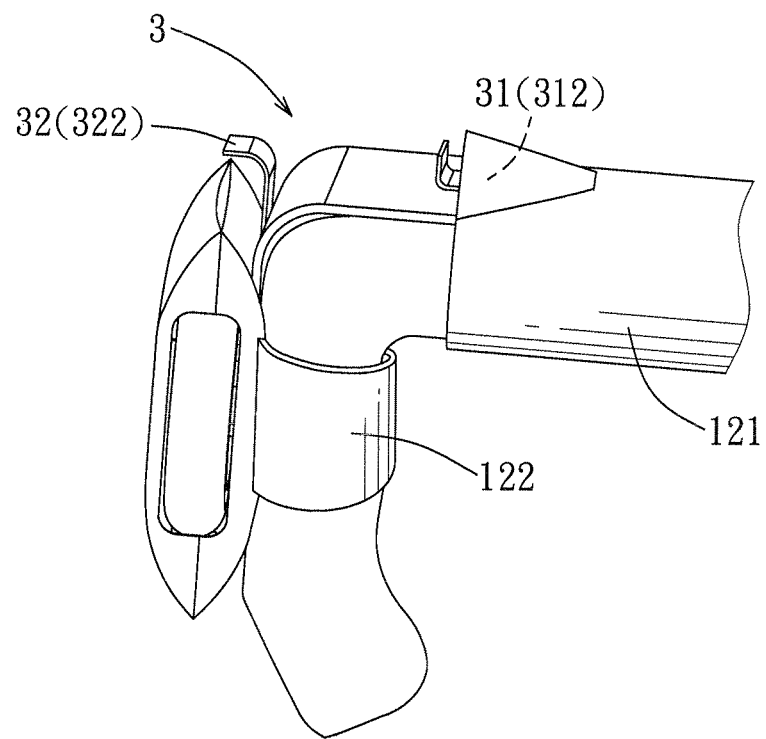
FIG. 8 is a perspective view illustrating a second embodiment of the finger control device of the present invention, wherein the second finger securing portion is at the second position.

Referring to FIG. 8, a second embodiment of the finger control device according to the present invention is illustrated. The second embodiment is substantially the same as the first embodiment, and only differs from the first embodiment in the configurations that the first sensor element 31 is a conductive element 312, such as a metal plate, and the second sensor element 32 is another conductive element 322.

Figure 9:
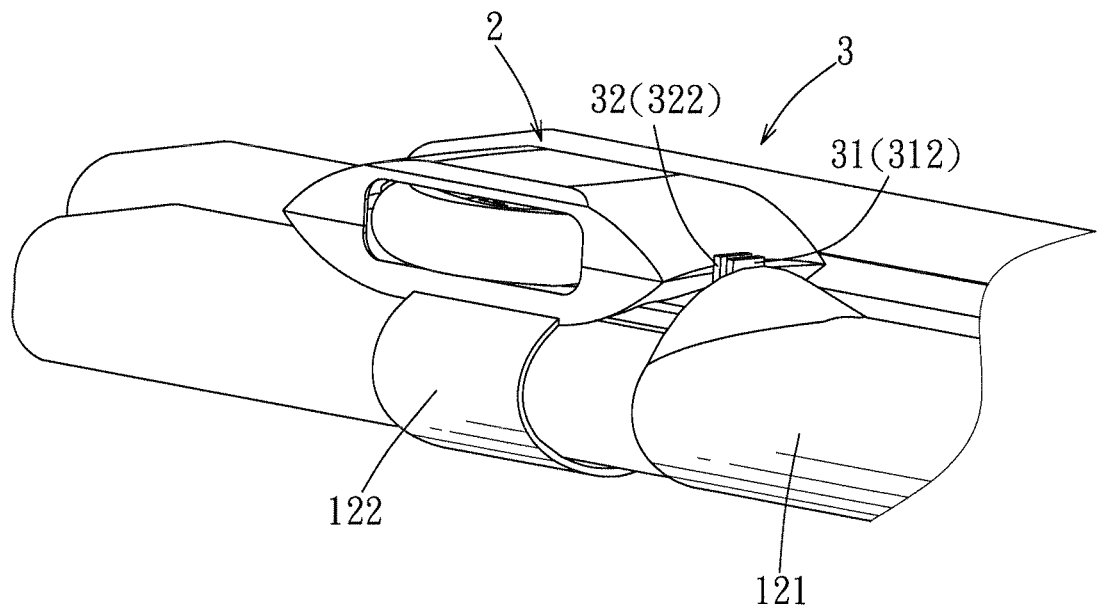
FIG. 9 is a perspective view illustrating the second finger securing portion of the second embodiment at the first position.

Therefore, referring to FIG. 9, when the user stretches the index finger to move the second finger securing portion 122 to the first position, the two conductive elements 312, 322 are able to contact each other so as to form an electric path between the two conductive elements 312, 322 such that the processing module 41 controls the computer 200 to operate in the first mode. On the contrary, when the user bends the index finger to move the second finger securing portion 122 to the second position as shown in FIG. 8, the two conductive elements 312, 322 are unable to contact each other such that the electric path between the two conductive elements 312, 322 is broken. At this time, the processing module 41 controls the computer 200 to operate in the second mode and controls the computer 200 to perform the corresponding action in the vertical direction according to rotation of the wheel body 231. Therefore, in this embodiment, the function of switching the operating mode of the computer 200 may be likewise achieved through bending of the user's finger.

In summary, by means of disposing each of the first sensor element 31 and the second sensor element 32 at a respective one of the first section and the second section of the user's finger, and by means of bending of the user's finger for controlling whether the first sensor element 31 is able to interact with the second sensor element 32, the finger control device 100 of the present invention may switch the operating mode of the computer 200. Therefore, not only is the function of the wheel unit 2 expanded, but convenience of operation thereof is also increased.

While the present invention has been described in connection with what are considered the most practical and embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A finger control device to be disposed on a user's hand for controlling an electronic device to switch an operating mode thereof, said finger control device comprising:
   a main body including a first securing part to be disposed on a palm of the hand and a second securing part, said second securing part including a first finger securing portion and a second finger securing portion, said first finger securing portion to be disposed on a first section of a finger of the hand and being connected to said first securing part, said second finger securing portion to be disposed on a second section of the finger and being movably connected to said first finger securing portion;
   a sensor unit including a first sensor element disposed at said first finger securing portion, and a second sensor element disposed at said second finger securing portion, said second finger securing portion being movable through bending of the finger between a first position corresponding to a first finger gesture in which said first sensor element is able to interact with said second sensor element and a second position corresponding to a second finger gesture in which said first sensor element is unable to interact with said second sensor element;
   a control unit disposed at said main body and operable to control the electronic device to operate in a first mode when said second finger securing portion is at the first position, and to control the electronic device to operate in a second mode when said second finger securing portion is at the second position; and
   a wheel unit rotatably disposed at said second securing part;
   wherein said control unit is further operable to control the electronic device to perform a first operation according to rotation of said wheel unit when the electronic device operates in the first mode so long as the first finger gesture is maintained, and to control the electronic device to perform a second operation different from the first operation according to rotation of said wheel unit when the electronic device operates in the second mode so long as the second finger gesture is maintained;
   wherein the first operation performed by the electronic device is one of a horizontal scrolling operation and a vertical scrolling operation, and the second operation performed by the electronic device is the other one of the horizontal scrolling operation and the vertical scrolling operation.

2. The finger control device as claimed in claim 1, wherein said first sensor element is a light sensor module, and said second sensor element is a light source, said second finger securing portion being at the first position when said light sensor module is able to sense light beams emitted from said light source, said second finger securing portion being at the second position when said light sensor module is unable to sense the light beams emitted from said light source.

3. The finger control device as claimed in claim 1, wherein said first sensor element is an electrically-conductive element, and said second sensor element is another electrically-conductive element, said second finger securing portion being at the first position when said two electrically-conductive elements are able to contact each other, said second finger securing portion being at the second position when said two electrically-conductive elements are unable to contact each other.

4. The finger control device as claimed in claim 1, wherein said wheel unit includes:
   a lower casing connected to said second securing part of said main body, said lower casing having a lower recess part and two first casing fasteners respectively disposed at opposite ends of said lower casing;
   an upper casing able to combine with said lower casing, said upper casing having an upper recess part corresponding in position to said lower recess part, and two second casing fasteners respectively disposed at opposite ends of said upper casing and respectively corresponding in position to said first casing fasteners, one of said first and second casing fasteners being a hole, the other one of said first and second casing fasteners being a post to engage said hole, said upper casing and said lower casing cooperating to define an opening when combined together;
   a wheel element including a rotatable wheel body and two protrusions respectively extending from opposite sides of said wheel body, each of said protrusions extending into a respective one of said upper recess part and said lower recess part for retaining rotatably said wheel element between said upper casing and said lower casing, said wheel body having a portion exposed from said upper casing and said lower casing through said opening; and
   an encoder disposed at one of said upper casing and said lower casing for generating a corresponding wheel signal according to rotation of said wheel body.

5. The finger control device as claimed in claim 4, wherein said lower casing is connected to said second finger securing portion.

6. The finger control device as claimed in claim 4, wherein said control unit includes a processing module disposed at said first securing part of said main body, and a transmission module disposed at said first securing part and electrically coupled to said processing module, said processing module controlling operation of the electronic device in the first mode according to rotation of said wheel unit while said second finger securing portion is at the first position, and controlling operation of the electronic device in the second mode according to rotation of said wheel unit while said second finger securing portion is at the second position, said transmission module being used for communication with the electronic device, and transmitting control signals generated by said processing module to the electronic device.

7. The finger control device as claimed in claim 6, wherein said control unit further includes a signal cable disposed at said first securing part and said second securing part, said signal cable electrically coupling said encoder of said wheel unit, said processing module and said transmission module.

8. The finger control device as claimed in claim 6, wherein said first securing part of said main body includes a securing portion for securing to the palm, and a disposing portion connected to said securing portion and to be located at a back side of the palm, said disposing portion being provided for disposing said processing module and said transmission module thereon.

9. The finger control device as claimed in claim 1, wherein the first finger gesture corresponds to a position where the finger is substantially straight and the second finger gesture corresponds to a position where the finger is substantially bent.

10. The finger control device as claimed in claim 1, wherein the wheel unit is positionable on the second finger securing portion, and wherein the wheel unit is positioned and oriented to allow the user's thumb to roll the wheel unit in first and second directions.

* * * * *